DYNAMIC VISCOELASTOMETER

Filed Dec. 27, 1966 7 Sheets-Sheet 1

INVENTOR
MILTON WELHOELTER
MERRILL JENKINS
BY
Robert J. Schaap
ATTORNEY

DYNAMIC VISCOELASTOMETER
Filed Dec. 27, 1966 7 Sheets-Sheet 2
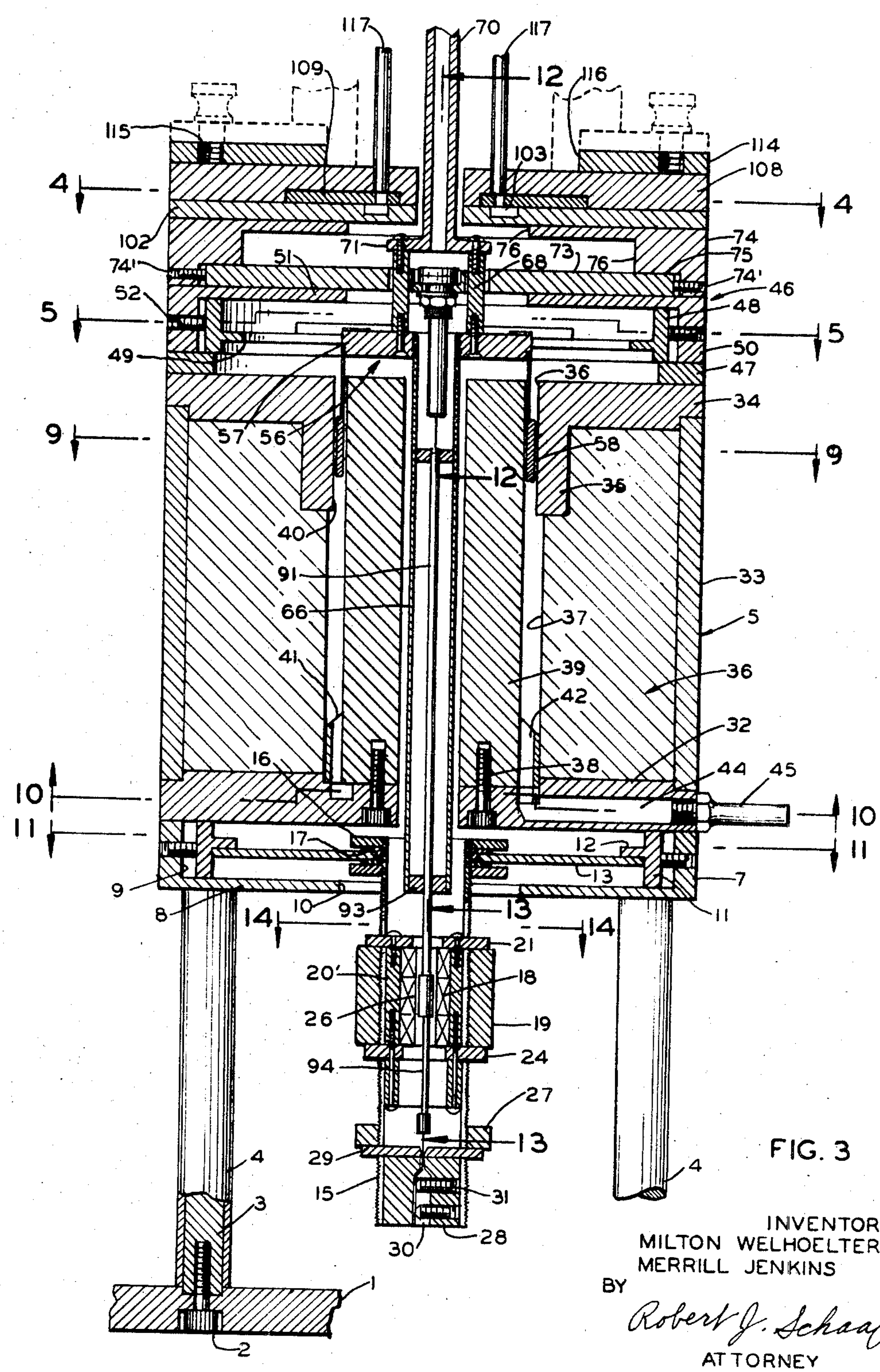

DYNAMIC VISCOELASTOMETER
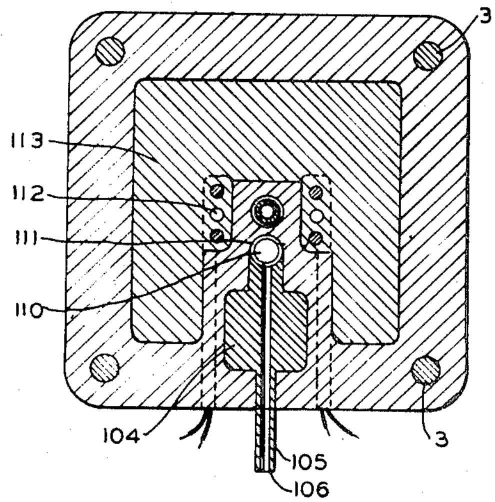
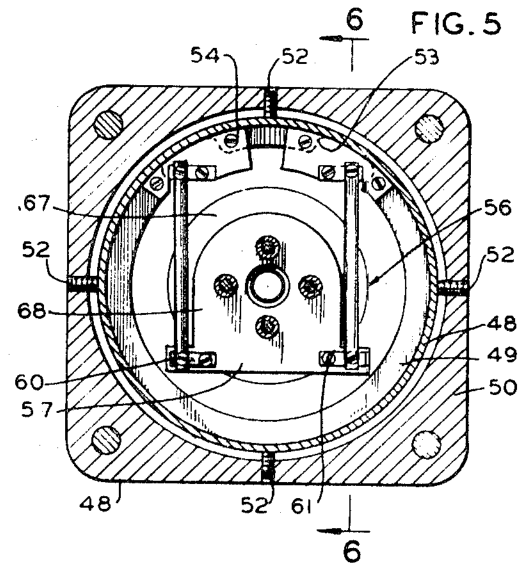
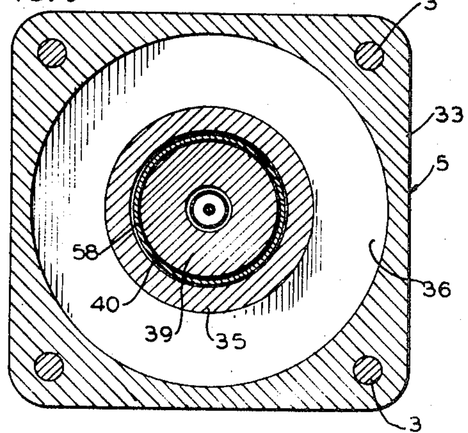
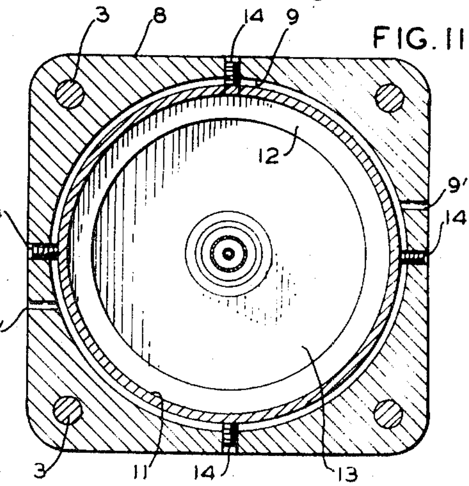
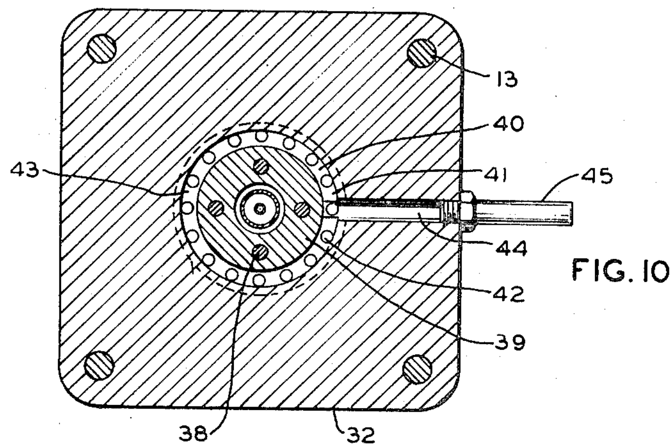
FIG. 10
INVENTORS
MILTON WELHOELTER
MERRILL JENKINS
BY
Robert J. Schaap
ATTORNEY DYNAMIC VISCOELASTOMETER
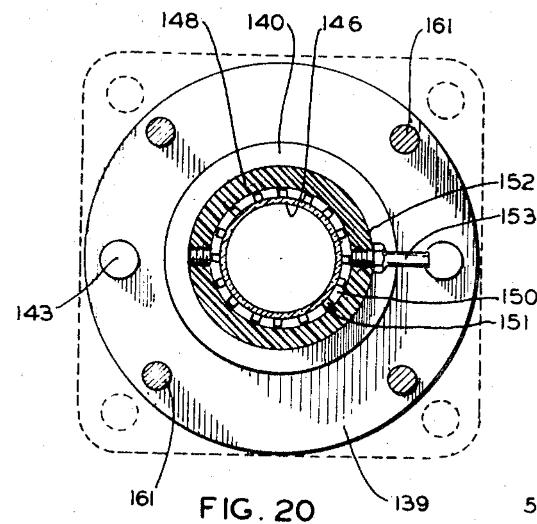
FIG. 20
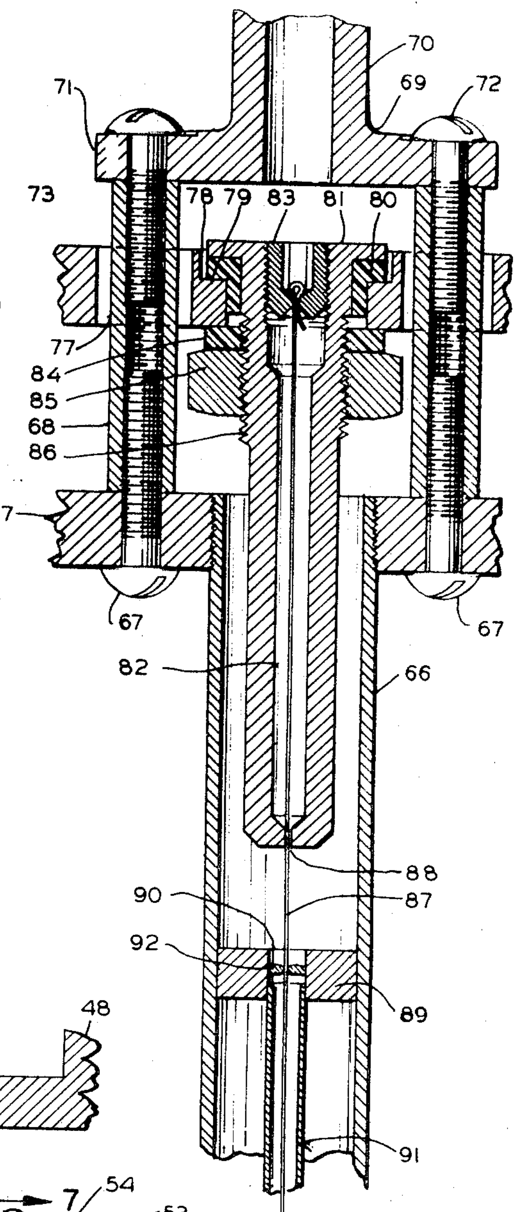
FIG. 12
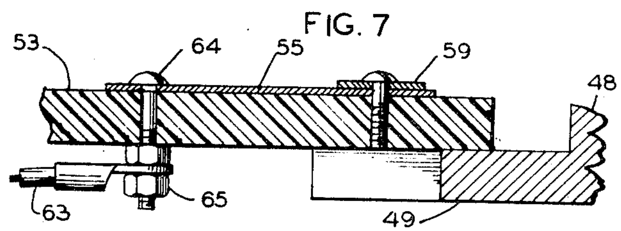
FIG. 8
FIG. 7
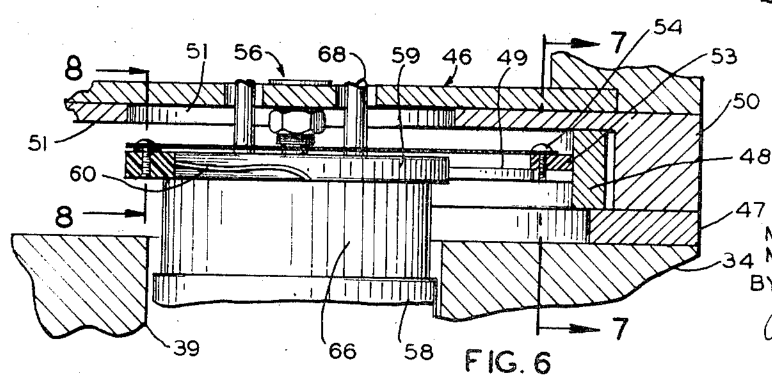
FIG. 6
INVENTORS
MILTON WELHOELTER
MERRILL JENKINS
BY
Robert J. Schaap
ATTORNEY

DYNAMIC VISCOELASTOMETER

Filed Dec. 27, 1966 7 Sheets-Sheet 5

INVENTOR
MILTON WELHOELTER
MERRILL JENKINS
BY
Robert J. Schaap
ATTORNEY

DYNAMIC VISCOELASTOMETER
Filed Dec. 27, 1966 7 Sheets-Sheet 6
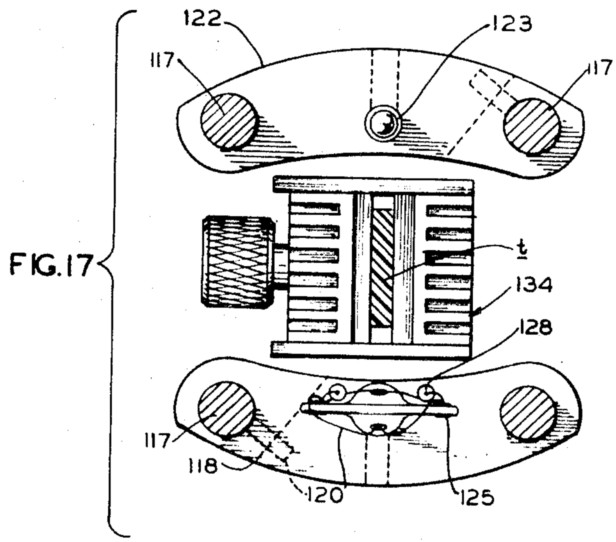
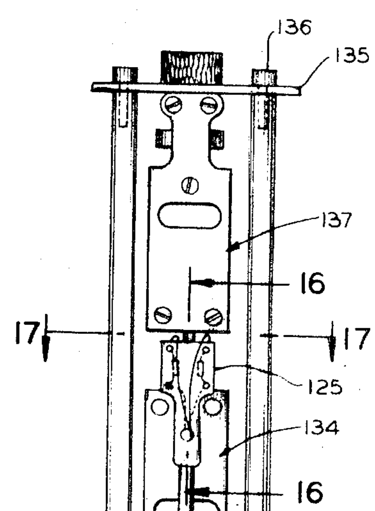
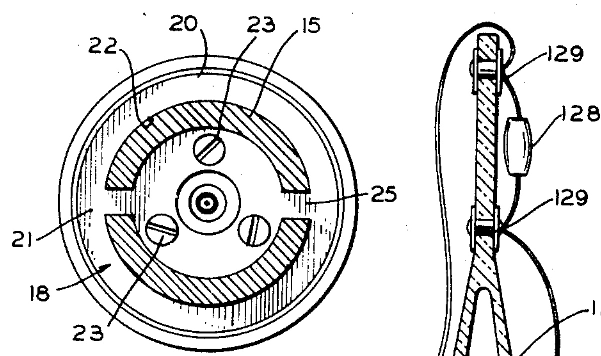
FIG. 14
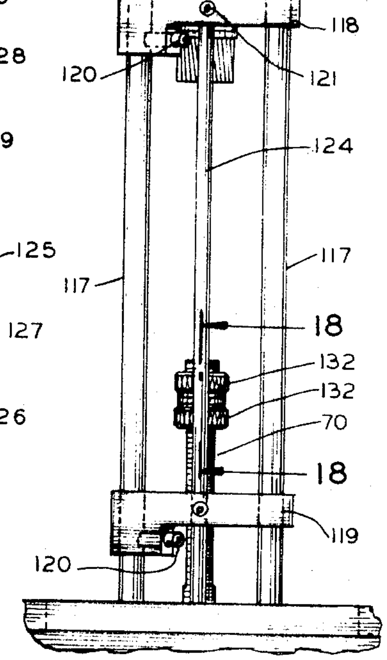
FIG. 15
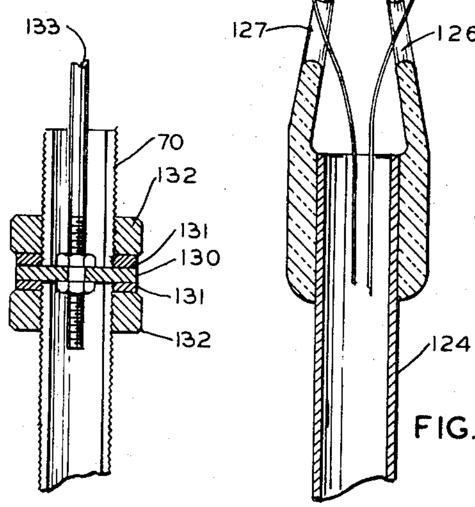
FIG. 18
FIG. 16
INVENTORS
MILTON WELHOELTER
MERRILL JENKINS
BY
Robert J. Schaap
ATTORNEY

DYNAMIC VISCOELASTOMETER

INVENTORS
MILTON WELHOELTER
MERRILL JENKINS
BY
Robert J. Schaap
ATTORNEY

United States Patent Office 3,470,732
Patented Oct. 7, 1969

3,470,732
DYNAMIC VISCOELASTOMETER
Milton Welhoelter, Rock Hill, and Merrill Jenkins, Spanish Lake, Mo., assignors to Monsanto Company, St. Louis, Mo., a corporation of Delaware
Filed Dec. 27, 1966, Ser. No. 604,988
Int. Cl. G01n *25/02, 29/00;* G01m *7/00*
U.S. Cl. 73—15.6 17 Claims

ABSTRACT OF THE DISCLOSURE

A dynamic discoelastometer which comprises a base housing and a sample removably maintained on the base housing for holding a test sample. One end of the test sample is rigidly mounted and the other is operatively attached to a force coil which is movable in a magnetic field. A very unique finely adjusted piano type guide wire provides a substantially friction free balancing of the forcing coil in the magnetic field. A linear variable differential transformed is operatively connected to the force coil for sensing the movement of the force coil which is in turn a measure of the dynamic viscoelastic properties of the test sample.

This invention in general to certain new and useful improvements in dynamic viscoelastometers and more particularly to automatic forced vibration dynamic modulus testers for measuring the elastic modulus of test samples.

The dynamic viscoelastic properties of polymers and particularly of plastic are quite important to both the manufacturers and purchasers of such materials. The manufacturer of polymers must be constantly aware of such properties as the modulus of elasticity and the viscosity of the material at various temperatures, particularly for quality control purposes. For the purchaser of polymers, the viscoelastic properties are important criteria in the selection of polymers. Accordingly, there is a definite need for accurate and reliable data on the viscoelastic property of polymers. Heretofore, for the study of mechanical properties of high polymers, there have been two complementary methods for determination thereof. These methods of determining the mechanical properties of polymers are based on static and dynamic experiments.

The static experiments include the measurement of creep at a fixed stress or stress relaxation at a fixed strain. In static experimentation, the displacement and mechanical deformation or so-called "creep" is often determined by commercially available extensiometers. It is also a common practice to use various devices which employ micrometers for measuring the degree of deformation or deflection of plastic test samples. There are also various devices which employ strain gauge sensing elements with extensometers for measuring the degree of deformation. However, devices of this type require careful setting and constant surveillance in order to eliminate unauthorized displacement of the test sample. Moreover, devices of this type were difficult to read and are not sufficiently accurate for all measurements desired. Furthermore, many of these devices are totally unsatisfactory for measuring small amounts of deformation in the range of 0.001 or 0.002 inch. This initial measurement is an important one and not often very accurate in the presently available devices.

The methods of determining the dynamic mechanical properties of polymers involve a measurement of the dynamic elastic modulus or dynamic determinination of complex quantities under sinusoidal deformation. These methods for the determining of dynamic mechanical properties of polymers involves the measurement of stress and strain and the time leg between them when subjected to sinusoidal deformation.

There have been a number of experimental methods to measure properties such as the dynamic elastic modulus, and the loss modulus. These included devices to determine moduli from measurement of oscillations resulting from interaction of the elasticity of the sample with the interia of the mass of the testing system. In general the elastic modulus is determined by the frequency and the loss modulus by the decay of the amplitude of oscillations in time or by broadening of the resonance curve with changes in frequency. This method has been most popular for the study of temperature variation of viscoelastic properties. However, the frequency of oscillation is determined by the mechanical properties of the specimen which change with temperature, and it is difficult or impossible to control the frequency or in some cases to maintain resonance. Furthermore, the measurement of viscoelastic properties by resonance methods has been a rather time consuming and laborious operation because of the intermittent repetitive excitation of oscillation and observation of changes in the amplitude.

One of the major problems with the presently available viscoelastometers and dynamic modulus testers is the available degree of accuracy attainable in measurements. Generally, the sensing element or device which causes movement of the plastic test sample is usually subjected to some type of internal distortion in the measurement device such as friction. Any slight interference, whatsoever, with the measurement will materially distort the accuracy of the device. Furthermore, it is often necessary to change the temperature of the test sample over a wide range of temperature and atmospheric conditions during measurement of the elastic modulus and loss modulus. Most of the commercially available devices are not capable of producing rapid changes over wide ranges of temperature which are necessary for such measurements.

OBJECTS

It is, therefore, the primary object of the present invention to provide a dynamic viscoelastometer which is capable of measuring the dynamic elastic modulus and loss modulus of test samples over a wide temperature range and under controlled conditions.

It is another object of the present invention to provide a dynamic viscoelastometer of the type stated which operates on a forced vibration principle rather than a resonance oscillation principle for providing viscoelastic measurements over a large frequency range. The frequency range was arbitrarily set at 1000 to 1 or 30 to .03 cycle per second, making the mean about one cycle per second which is approximately the average frequency of testing done in the past.

It is a further object of the present invention to provide a dynamic viscoelastometer of the type stated which provides an inexpensive and rapid method for testing a large number of samples with a high degree of accuracy.

It is also an object of the present invention to provide a method of determining viscoelastic properties of samples by stretching a sample with a measured sine wave force and measuring the degree of deformation produced.

It is another salient object of the present invention to provide a dynamic viscoelastometer of the type stated which is capable of rapid operation and is highly reliable.

With the above and other objects in view, our invention resides in the novel features of form, construction, combination and arrangement of parts presently described and pointed out.

FIGURES

In the accompanying drawings:

FIGURE 3 is a fragmentary vertical sectional view taken along line 3—3 of FIGURE 1 and showing the internal construction of the forcing section forming part of the dynamic viscoelastometer;

FIGURE 4 is a horizontal sectional view taken along line 4—4 of FIGURE 3 and showing the refernce disc and fluid duct work forming part of the forcing unit;

FIGURE 5 is a horizontal sectional view taken along line 5—5 of FIGURE 4 and showing the mounting of the forcing coil forming part of the forcing unit;

FIGURE 6 is a vertical sectional view partially broken away and taken along line 6—6 of FIGURE 5;

FIGURE 7 is a vertical fragmentary sectional view taken along line 7—7 of FIGURE 6;

FIGURE 8 is also a fragmentary sectional view taken along line 8—8 of FIGURE 6;

FIGURE 9 is a horizontal sectional view taken along line 9—9 of FIGURE 3 and showing the spatial relationship of the forcing coil to the remainder of the forcing unit;

FIGURE 10 is a horizontal sectional view taken along line 10—10 of FIGURE 3 and showing the fluid duct work forming part of the cooling system of the forcing unit;

FIGURE 11 is a horizontal sectional view taken along line 11—11 of FIGURE 3 and showing a centering mechanism forming part of the dynamic viscoelastometer;

FIGURE 12 is an enlarged fragmentary vertical sectional view taken along line 12—12 of FIGURE 3 and showing the mounting of the guide wire forming part of the dynamic viscoelastometer;

FIGURE 14 is a horizontal sectional view taken along line 14—14 of FIGURE 3 and showing the connection for mounting the linear variable differential transformer to the dynamic viscoelastometer;

FIGURE 15 is a fragmentary vertical elevational view taken along line 15—15 of FIGURE 1 and showing the details of construction of the test sample retaining unit;

FIGURE 16 is a fragmentary vertical sectional view taken along line 16—16 of FIGURE 15 and showing the details of construction of the temperature sensing unit which is disposed in the test specimen housing;

FIGURE 17 is a horizontal sectional view taken along line 17—17 of FIGURE 15 and showing the specimen clamps forming part of the present invention;

FIGURE 18 is a vertical fragmentary sectional view taken along line 18—18 of FIGURE 15 and showing a sensitive adjustment mechanism for adjusting the test sample to a zero position;

FIGURE 20 is a horizontal sectional view taken along line 20—20 of FIGURE 19.

GENERAL DESCRIPTION

Figures 1, 2:
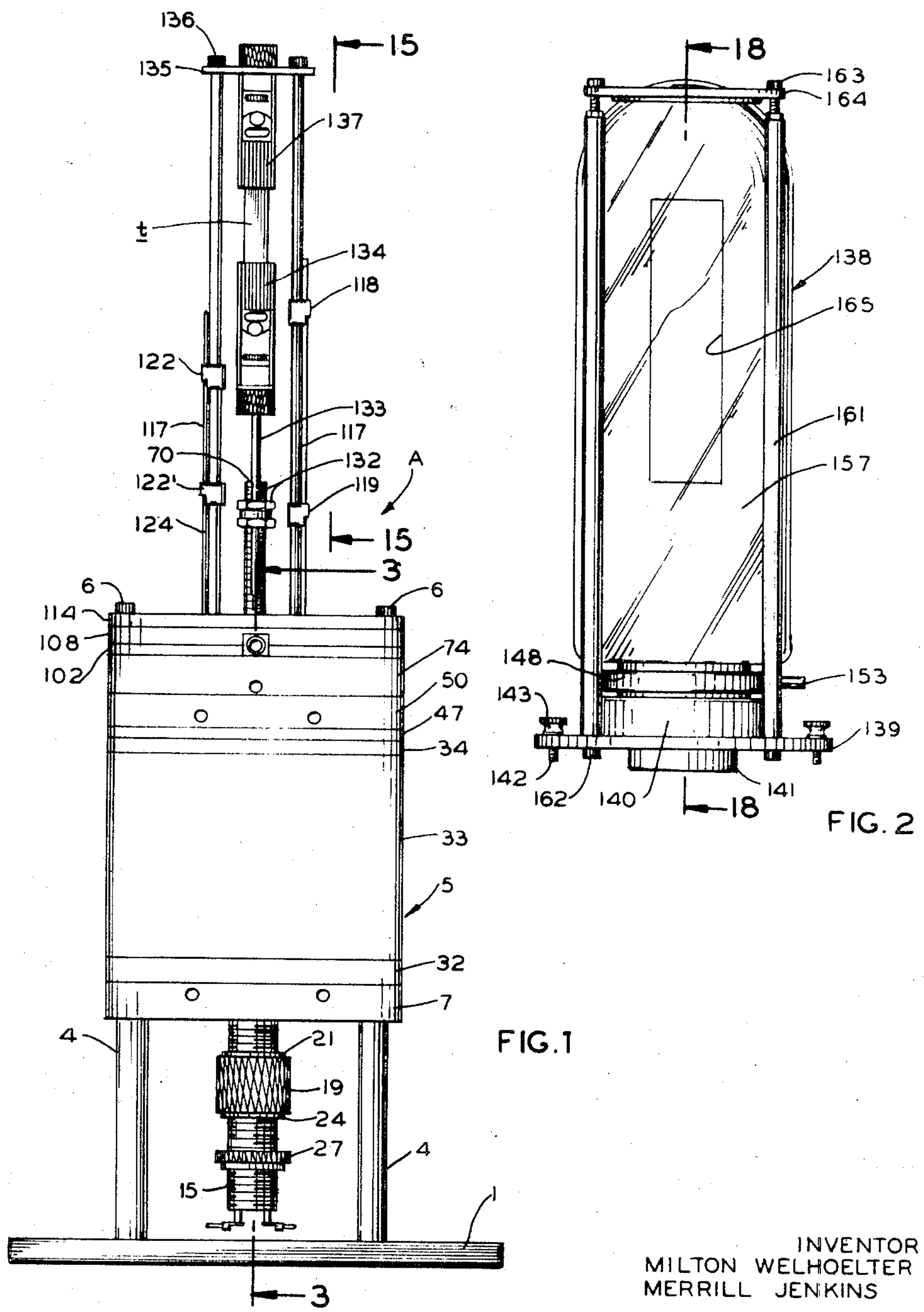
FIGURE 1 is a front elevational view of a dynamic viscoelastometer constructed in accordance with and embodying the present invention with the sample housing removed therefrom.
FIGURE 2 is a front elevational view of the sample housing which is adapted to be fitted upon and secured to the viscoelastometer of FIGURE 1.

Generally speaking, the dynamic viscoelastometer of the present invention is designed to stretch a plastic sample under a measured sine wave of force and thereby measure the resulting elongation. The elastic modulus can be computed either by hand or from a suitable completer, which is not described herein. Generally, the modulus is computed from the peak value of the force divided by the peak value of the elongation multipled by the length of the sample and divided by its area. From the measurements obtained from the dynamic viscoelastometer, it is also possible to compute the loss factor which is a measure of the loss produced by the non-elastic or viscous nature of the polymer and is equal to the tangent of the phase angle between the sine waves of the force and elongation. The design of the dynamic viscoelastometer is based on an electromechanical system in which the force is linear with current so that the unit could be used as a transducer to measure force by measuring current.

The dynamic viscoelastometer generally comprises a base upon which are mounted four legs and mounted on the upper end of the four legs is a forcing unit which includes an outer housing and an internally disposed electromagnet. The housing also includes an annular air gap between the poles of the electromagnet in which is mounted a vertically movable forcing coil. The forcing coil is centered in this annular gap in such a manner that it can be moved vertically for a limited distance pursuant to excitation from an external signal. The force coil is mounted in such manner that it is capable of accommodating coil leads. The forcing unit housing is also suitably provided with the necessary duct work for providing a cooling media. A gas coolant is injected in the lower end of the housing and passes through the area surrounding the forcing coil and the electromagnet. The coolant is circulated around the housing and is exhausted from both the lower and upper ends of the housing.

Rigidly mounted on the upper end of the forcing unit housing is a support plate for retaining a sample unit. The sample unit generally comprises a plurality of upstanding legs upon which are mounted brackets for holding temperature sensors and a set of thermocouples. Also secured to the upper ends of the support rods is a metal plate for retaining an upper clamp. Spaced downwardly from and in vertically disposed relationship to the upper clamp is a lower clamp for retaining a test sample which is designed to extend therebetween. The lower clamp is secured to a depending support rod which is, in turn, operatively secured to the top of the forcing coil. In essence, the forcing coil is connected to the lower clamp. As the forcing coil is shifted vertically within the air gap between the poles of the electromagnet by the interaction of electric current in the coil and the magnetic flux between the poles of the electromagnet, the plastic test sample will be moved therewith. When the forcing coil is subjected to sinusoidal movement, the plastic test sample will, in turn, be subjected to a sinusoidal movement. Surrounding the sample unit is a complex heat insulated jacket which contains an electric heating coil for raising the temperature of the test sample.

The jacket is also designed to provide an annulus around the support bars which hold the clamping system in order to permit the entry of a coolant gas. The gas is passed through the entire area surrounding the test sample and outwardly through an exhaust system formed in the forcing unit housing.

Mounted on the lower end of the forcing unit housing and extending downwardly therefrom is a measurement unit which comprises a linear voltage differential transformer or so-called "LVDT." The core of the transformer is a ferromagnetic element which is secured to a tube, the latter being connected to and movable with the force coil. A unique guide system is provided for holding each of the elements in proper vertical position. The guide system relys upon a vertically disposed quite thin piano-type guide wire. The piano-type guide wire extends through a unique bearing system which includes a plurality of vertically spaced watch jewels for holding the wire in an essentially friction-free manner so that there is no interference with movement of the core in the linear voltage differential transformer. In fact all of the vertically moveable elements are aligned with respect to and move with respect to said guide wire. It can thus be seen, that as the core shifts within the linear voltage differential transformer, a voltage will be induced in the secondary windings of the transformers which is proportional to the movement of the force coil in the electromagnet. The movement of the force coil is, in turn, controlled by the amount of elongation in the test sample and this, of course, is a function of the elastic modulus of the test sample. It can, therefore, be seen that the voltage produced in the LVDT secondary is a direct function of the elastic modulus of the test sample.

DETAILED DESCRIPTION

Referring now in more detail and by reference characters to the drawings which illustrate a preferred embodiment of the present invention, A designates a dynamic visco-elastometer which generally comprises a base plate 1 and rigidly secured to the base plate 1 by means of machine screws 2 are four rectangularly spaced upstanding rods 3. Concentrically disposed about each of the four rods 3 are circular spacer sleeves 4 which abut the base plate 1 at their lower end and have a length substantially shorter than the overall length of each of the posts or rods 3. Supported upon the upper margin of each of the spacer sleeves 4 is a forcing unit housing 5 which is formed by a series of laminated plates in a manner to be hereinafter described in detail. However, each of the plates in the housing 5 is also apertured in order to accommodate the various upstanding posts 3. Furthermore, the various plates in the housing 5 are vertically registered and held securely in place by means of machine screws 6, which are threaded into the upper end of the posts 3 in the manner as illustrated in FIGURE 1.

The forcing unit housing 5 at its lower end includes a relatively thick plate 7 having a relatively flat bottom wall 8 and an upstanding annular side wall 9. The side wall 9 is provided with a pair of exhaust apertures 9' for reasons which will presently more fully appear. The plate 7 is provided with a hollow interior and a central aperture 10. Fitted within the hollow portion of the plate 7 and being flush with the upper margin of the annular wall 9 is a support ring 11, which is integrally formed with a horizontally disposed inwardly extending annular flange 12 and secured to the underside of the flange by any conventional means, such as sheet metal screws in a mounting plate 13. The mounting plate 13 is also provided with a central aperture for reasons which will presently more fully appear. Furthermore, the support ring 11 is diametrally smaller than the annular side wall 9 of the plate 7 and the support ring 11 is centered therein by means of four circumferentially spaced set screws 14 in the manner as illustrated in FIGURE 3.

The monuting plate 13 is centrally apertured to accommodate a depending externally threaded mounting tube 15 which may be provided with a pair of diametrally opposed vertically extending slots. The tube 15 is retained in the central aperture of the mounting plate 13 by means of a pair of locking nuts 16 and insulating washers 17 disposed on opposite sides of the plate 13 in the manner as illustrated in FIGURE 3.

A linear variable differential transformer assembly 18, which serves as a signal producing unit is secured to the mounting tube 15 in the manner as illustrated in FIGURES 3 and 14. The LVDT assembly 18 comprises an outer knurled housing 19, which is threaded about the externally threaded portion of the mounting tube 15 and provides a means to adjust the vertical position of the inner tube housing 20', which is concentrically disposed about the hollow mounting tube 15. The LVDT assembly 18 also comprises an inner tube housing 20', which is concentrically disposed within the hollow mounting tube 15. Disposed on the upper end of the knurled outer housing 19 is a retaining ring 21, which is provided with a pair of arcuate slots 22, the latter being provided for accommodation of the externally threaded mounting tube 15. The retaining ring 21 is securely held in place by means of three circumferentially spaced machine screws 23, which are threaded into the inner tube housing 20', in the manner as illustrated in FIGURES 3 and 14. A similar retaining ring 24 is held in place against the underside of the knurled outer housing 19 by three screws which pass through and secure the ring 21, also in the manner as illustrated in FIGURE 3. The diametrally opposed slots in the mounting tube 15 serve to prevent rotation of the retaining rings 21, 24 which in turn retain both the knurled outer housing 19 and the coils of the LVDT assembly 18. By further reference to FIGURE 14, it can be seen that the arcuate slots 22 are so formed so that the retaining ring 21 in effect has an integrally formed diametrally extending cross bar 25, which extends through the arcuate slots in the mounting tube 15. Mounted on the interior of the inner tube housing 20' are the three abutting axially aligned transformer coils 26 of the linear voltage differential transformer 18.

Also threaded about the externally threaded mounting tube 15 in downwardly spaced relation to the LVDT assembly 18 is another locking nut 27 and disposed within the lower open end of the tube 15 is a retaining plug 28, which has an integrally formed outwardly extending annular flange 29, the latter abutting against the under surface of the locking nut 27. The annular flange 29 is similarly provided with the arcuate slots (not shown) and the cross bar in the same manner as the retaining rings 21 and 24, where the cross bar extends through the diametrally opposed slots formed in the mounting tube 15. The retaining plug 28 is axially drilled to accommodate the electrical leads (not shown) from the transformer coils 26. The ring 21 serves as a distributor of the electrical leads and prevents them from interferring with the movement of the other elements in the lower end of the tube 15. These leads are ultimately connected to a suitable readout device, or computerized device for computing the desired visco-elastic measurements such as loss modulus and elastic modulus. The retaining plug 28 is also provided with an axial bore 30 and a pair of set screws 31, which extend radially into the plug 28 and into the bore 30 in the manner as illustrated in FIGURE 3. The bore 30 and set screws 31 are provided for reasons which will presently more fully appear.

By further reference to FIGURE 3, it can be seen that the support ring 11 functions as a reference disc, in that it provides for proper centering of the LVDT assembly 18. It can be seen that by adjusting each of the set screws 14, it is possible to center the mounting tube 15 so that its axial centerline is coincident with the axial centerline of the whole moving system hereinafter described in more detail.

The forcing unit housing 5 includes a relatively thick base plate 32 which is annularly grooved along its periphery to accommodate an annular side wall 33. Similarly secured to the upper end of the annular side wall 33 is a top plate 34 which is centrally apertured and has an integrally formed annular downwardly extending flange 35 which serves as one magnetic pole of an electromagnetic coil or so-called "electromagnet" 36 along the periphery of the aperture. Mounted in the forcing unit housing 5 and being supported by the base plate 32 is the wound copper electromagnetic coil 36, which is also centrally apertured and thereby forms an annular bore 37 with the flange 35. Inserted into the annular bore 37 and being secured to a circular recessed portion of the base plate 32 by means of machine screws 38 is a central hollow magnetic core 39, which is spaced from the walls of the annular flange 35 and the annular interior wall of the electromagnetic coil 36 and thereby forms an annular air gap 40 in which the magnetic flux of the electromagnet 36 is concentrated. The magnetic core 39 is integrally formed along its lower end with an outwardly extending fluid manifold 41 and which is provided with a plurality of circumferentially spaced axial fluid ducts 42 for introducing a coolant into the bore 37 and for the purpose of cooling in a manner hereinafter described in more detail. For the purpose of the present invention, a cooling gas such as nitrogen or air serves as a suitable coolant fluid. Each of the gas ducts 42 communicates with an annular groove 43 formed within the base plate 32 and the annular groove 43 in turn communicates with a radial duct 44, which is formed in the base plate 32. The duct 44 is internally threaded at its outer end for accommodation of a pipe fitting 45. This structure is more fully illustrated in FIGURES 3 and 10. The fitting 45 may be connected to a suitable source of coolant, such as gaseous nitrogen or air (not shown).

A force coil guide wire retaining unit 46 is mounted on the upper surface of the plate 34 and is more fully illustrated in FIGURES 3, 6–8 and 12. The force coil guide wire retaining unit 46 generally comprises a spacer plate 47, having an enlarged central aperture and being disposed on the upper surface of the top plate 34. Similarly disposed on the upper surface of the spacer plate 47 is a circular guide ring 48, which has an integrally formed inwardly extending annular flange 49, the latter also being centrally apertured in the manner as illustrated in FIGURES 3 and 6. The guide ring 48 is retained in place by means of a relatively thick retaining plate 50, which is centrally bored to accommodate the guide ring 48 and has an integrally formed inwardly extending top flange 51, which abuts against the upper surface of the guide ring 48 in the manner as illustrated in FIGURES 3 and 6. The side wall of the retainer plate 50 is also provided with a pair of gas exhaust apertures 50′ for reasons which will presently more fully appear. The annular wall of the retaining plate 50 is provided with four circumferentially spaced set screws 52 for maintaining proper alignment of the guide ring 48 within the housing 5 and providing for proper alignment of the guide ring 48 with the annular groove 40, for reasons which will presently more fully appear. A pair of Bakelite or other electrically non-conductive insulating strips or so-called insulators 53 are secured to the annular flange 49 by means of machine screws 54. A connector plate 55 is secured to each of the insulators 53 in the manner as illustrated in FIGURE 5.

Provided for operative actuation in the magnetic coil 36 is a force coil assembly, which generally comprises a laminated insulating support plate 57 and rigidly secured thereto is a depending wound copper force coil 58, the latter being disposed in the air gap 40 in the manner as illustrated in FIGURE 3. The force coil 58 is connected to a pair of relatively flat bronze connector strips 59 by means of a connecting wire 60 as illustrated in FIGURES 5 and 6. The connecting strips are secured to the support plate 57 by means of machine screws 61 and are also, in turn, secured to each of the connector plates 55 by means of screws 62. By further reference to FIGURE 7, it can be seen that the Bakelite insulators 53 extend inwardly of the inner margin of the flange 49 and electrical leads 63 are secured to the underside of the flange 49 by means of machine screws 64 and nuts 65. It can be seen that the machine screws 64 are in electrical contact with the connector plate 55 and, therefore, provide electrical connections through the bronze strips 59 to the force coil 58. By further reference to FIGURE 6, it can be seen that the bronze connecting strips 59 are relatively thin and quite flexible so that they do not interfere with or in any way impede the vertical movement of the force coil 58 in the air gap 40. The strips 59 do provide rotational restraint for the force coil 58. The alignment of the guide ring 48 provides the adjustment for this rotational restraint.

The support plate 57 is centrally apertured to accommodate a relatively long, downwardly extending guide sleeve 66 and which is threaded into the support plate 57. By reference to FIGURE 3, it can be seen that the guide tube extends downwardly into the central bore of the magnetic pole core 39, and downwardly therebeneath. Furthermore, it can be seen that the guide sleeve 66 is sized so that it does not contact the interior wall of the core 39 and therefore, does not in any way impede the movement of the force coil 58. Secured to the upper surface of the support plate 57 by means of machine screws 67 are four space guide posts 68. The guide posts 68 are internally tapped in order to accommodate the machine screws in the manner as illustrated in FIGURE 12. Rigidly secured to the upper end of the guide posts 68 is a mounting bracket 69, which integrally includes an upstanding hollow connecting tube 70 and an integrally formed outwardly extending mounting flange 71, which is in turn secured to the guide posts 68 by means of machine screws 72, all in the manner as illustrated in FIGURES 3 and 12.

A reference disc 73 is disposed on the upper surface of the top flange 51 in the manner as illustrated in FIGURES 3 and 12 and is retained thereon by means of a retainer plate 74. The retainer plate 74 is provided with an annular shoulder 75 containing four peripheral adjustment screws 74′ for engaging the periphery of the reference disc 73 which is rigidly held against the retaining plate 50 after adjustment of screws 74′. The screws 74′ are used to position the disc 73 for reasons which will presently more fully appear. The retainer plate 74 is also provided with a large central aperture 76 for accommodating the mounting bracket 69 during the shiftable movement thereof. By further reference to FIGURES 3 and 12, it can be seen that the reference disc 73 is provided with four apertures 77 in alignment with and for accommodation of each of the mounting posts 68 so that the support plate 57 and hence the force coil 58 are shiftable within the apertures 77 formed in the reference disc 73.

The reference disc 73 is provided with a central aperture 78, which is formed with a supporting shoulder 79 for retaining an insulating bushing 80 and which, in turn, supports a centering guide tube 81 in the manner as illustrated in FIGURE 12. The centering guide tube 81 is provided with an axial central bore 82 and which is tapped at its upper end to accommodate an anchor plug 83. The insulating bushing 80 and the centering guide tube 81 are retentively held against the shoulder 79 by means of an insulating washer 84 and a locking nut 85, the latter being disposed about an externally threaded section 86 of the tube 81 in the manner as illustrated in FIGURE 12.

The force coil 58 is free to move vertically and is retained in horizontal alignment in the air gap 40 by means of a guide wire 87, which is tied in the form of a knot and retentively held in the anchor plug 83, in the manner as illustrated in FIGURE 12. The guide wire 87 is a small diameter polished piano wire or similar high carbon steel wire. The guide wire 87 extends downwardly through the bore 82 in the centering guide tube 81 and extends downwardly therefrom through a close tolerance guiding bore 88 formed in the lower end of the tube 81. The guide sleeve 66 is provided with a bearing sleeve 89, which is internally disposed therein in the manner as illustrated in FIGURES 3 and 12. The bearing sleeve 89 is provided with a central aperture 90 and fitted in the lower end thereof is a depending guide tube 91, the latter being adhesively secured to or otherwise permanently affixed in the aperture 90 in the manner as illustrated in FIGURE 12. A jewel-type bearing 92, such as a watch jewel bearing, is press fitted in the aperture 90. The jewel bearing 92 is also centrally apertured to accommodate the guide wire 87 in the manner as illustrated in FIGURE 12. It should be noted that as the guide tube 91 is movable with the guide sleeve 66 which is in turn movable with the force coil 58, that the guide wire 87 will provide a horizontal alignment of the force coil 58. Furthermore, inasmuch as the jewel bearing 92 moves on the stationary guide wire 87 this type of construction provides an essentially friction-free movement of the guide sleeve 66 with respect to the guide wire 87.

Figures 13, 19:
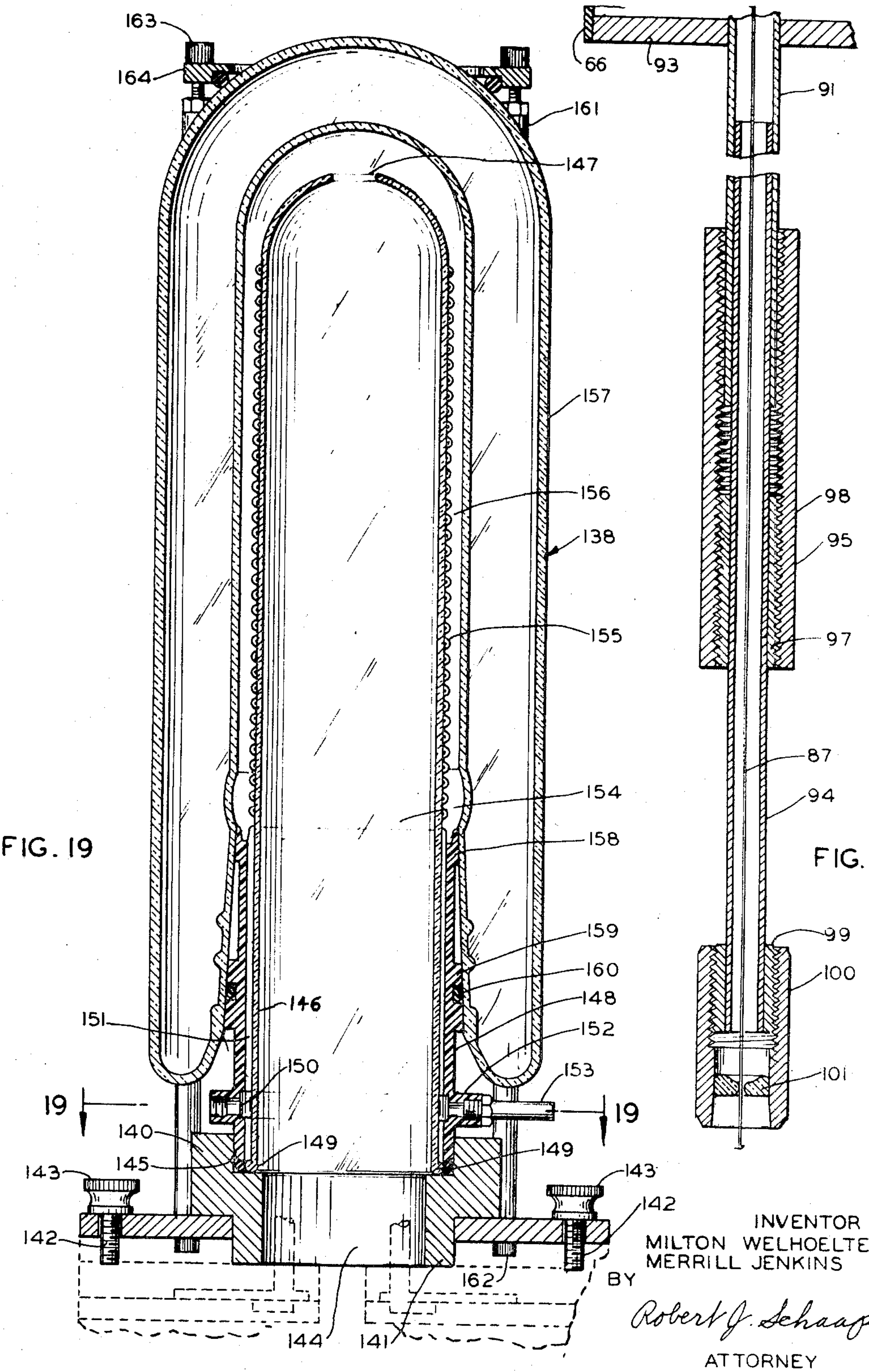
FIGURE 13 is an enlarged fragmentary vertical sectional view taken along line 13—13 of FIGURE 3 and showing the core of the linear variable differential transformer sensor and the lower guide jewel included in the dynamic viscoelastometer.
FIGURE 19 is an enlarged fragmentary vertical sectional view, partially broken away, and showing the details of construction of the test sample housing forming part of the dynamic viscoelastometer.
Figure 21:
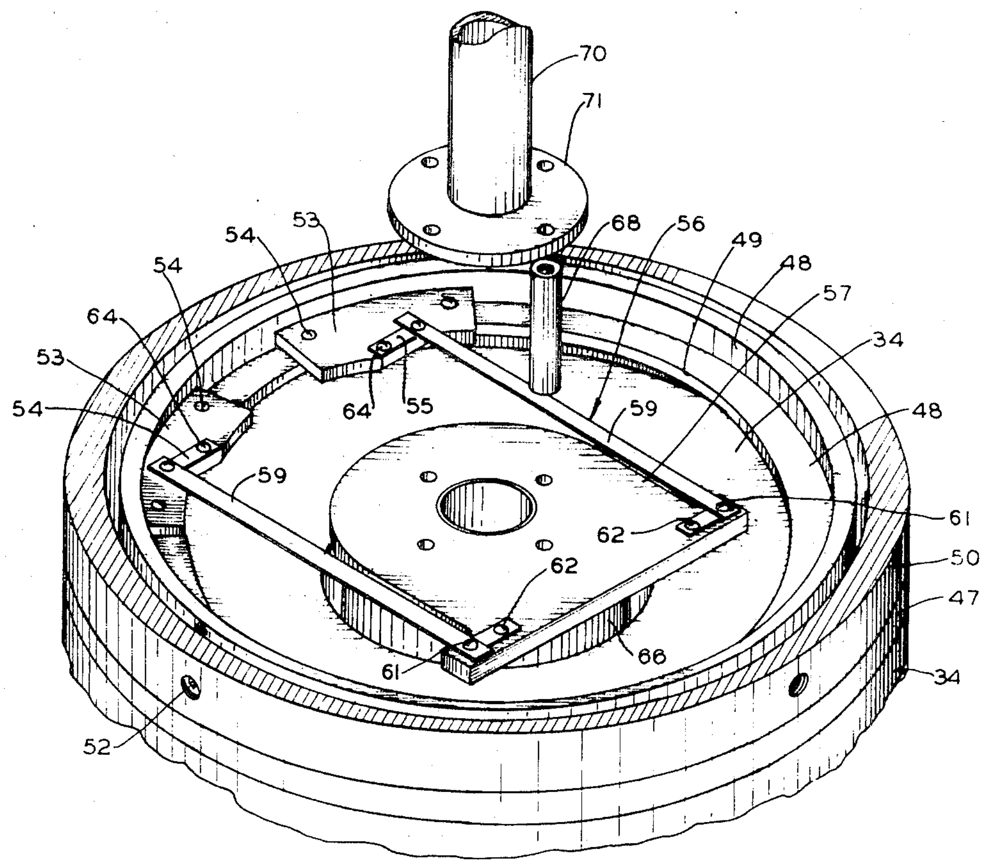
FIGURE 21 is a perspective view showing the deails of construction of the mounting for the forcing coil forming part of the forcing unit in the viscoelastometer.

The guide tube 91 is also held in vertical alignment with respect to the guide sleeve 66 by means of a retaining disc 93 which is secured to the lower end of the guide sleeve 66, in the manner as illustrated in FIGURE 3. Concentrically disposed within the lower end of the open-ended guide tube 91 is a depending extension tube 94 and secured thereto in the manner as illustrated in FIGURES 3 and 13, is a transformer core 95, which is more fully illustrated in FIGURE 13. The extension tube 94 is adhesively secured or otherwise rigidly affixed to the interior of the guide tube 91. Also concentrically disposed around and secured externally to the extension tube 94 is a threaded sleeve 97. An outer metallic sleeve 98 which serves as the transformer core 95 and is internally threaded is secured to the externally threaded sleeve 97 in the manner as illustrated in FIGURE 13. By reference to FIGURE 3, it can be seen that the core 95 is positioned within the coils 26 of the LVDT assembly 18.

Secured to the lower end of the extension tube 94 by any suitable adhesive, such as an epoxy resin, is an externally threaded mounting sleeve 99 and threadedly secured thereto is an internally threaded bearing sleeve 100. Mounted in the lower end of the bearing sleeve 100 is a jewel-bearing 101 which is substantially similar to the jewel-bearing 92. By further reference to FIGURE 13, it can be seen that the jewel-bearing 101 is press-fitted in the hollow portion of the bearing sleeve 100 and is centrally apertured to accommodate the guide wire 87. Furthermore, it can be seen that the force coil 58 is guided vertically and concentrically in the air gap 40 by concentric assembly of the tubes 66, 91, 94 and jewels 92 and 101 to which it is attached. The whole assembly is guided by a taut vertical polished wire 89 with essentially frictionless contact with the jewels 92, 101. By further reference to FIGURE 3, it can be seen that the guide wire 87 extends downwardly from the bearing sleeve 100 and through an aperture formed in the flange 29 and into the bore 30 formed in the retaining plug 28. It can be seen that the guide wire is secured at its lower end in the retaining plug 28 by means of the set screws 31. The guide wire 87 provides a means for maintaining proper orientation of the forcing coil 58.

It is possible to make the wire more taut by means of urging the wire downwardly through the guide tube 91 and extension tube 94 by turning the threaded knurled nut 27 down against the flange 29 of the plug 28 as shown in FIGURE 3. An adjustment of the LVDT knurled housing 19 with the coils 26 is made with respect to the core 95 by turning the knurled housing 19 along the externally threaded section of the mounting tube 15. Furthermore, it can be seen that the linear variable differential transformer assembly 18 can be maintained in proper vertical alignment with the guide sleeve 66 by adjustment of the set screws 14. By reference to FIGURE 3, it can be seen that by turning each of the four circumferentially spaced set screws 14, it is possible to position the support ring 11 in proper vertical alignment of the lower end of the wire 87 with the upper end which is positioned by adjustment of screws 74' orienting reference disc 73 for proper alignment of the force coil 58 in the air gap 40. In essence, therefore all of the other elements are adjusted with respect to the reference disc 73.

Facewise disposed upon the upper surface of the retainer plate 74 is a heat insulating plate 102, which is preferably made of balsa wood. The upper surface of the plate 102 is milled to form a cavity 103 for accommodation of a metal fluid exhaust housing 104. Secured to the forward end of the fluid housing 104 is a fluid exhaust port or conduit 105 for ultimate discharge to the atmosphere. The gas exhaust port 105, in turn, communicates with a radial gas duct 106 milled in plate 102. The plate 102 is also provided with a pair of wire ducts 107 to provide exit for electrical wires in a manner hereinafter described in detail.

Facewise disposed upon the upper surface of the heat insulating plate 102 is a mounting plate 108, which is provided with a recess 109 on its underside for accommodation of the upwardly extending gas exhaust port 105. The mounting plate 108 is also provided with a gas duct 110 which is in direct alignment with the radial duct 106. The plate 108 is also provided with an aperture 111, which communicates with the ducts 105, 110 for reasons which will presently more fully appear. The mounting plate 108 is also provided with a pair of electrical ducts 112 which communicate with the electrical ducts 107 for accommodation of electrical wiring. The mounting plate 108, which is also formed of wood is additionally grooved on its underside to accommodate a somewhat U-shaped metal plate 113.

Facewise disposed upon the upper surface of the mounting plate 108 is a metal cover plate 114. It should be understood that the upstanding posts 3 extend upwardly through aligned apertures formed in each of the aforementioned vertically aligned and registered pieces heretofore described. Each of the pieces is provided with marginally aligned apertures at approximately the four corners thereof in the manner as illustrated in FIGURES 4, 5 and 9–11. The posts 3 also terminate at the upper surface of the cover plate 114. The posts 3 are internally threaded for accommodation of the cap screws 6 in which manner each of the aforementioned pieces are held in assembled relationship as illustrated in FIGURES 1 and 3.

Rigidly secured to the metal plate 113 and extending upwardly therefrom through an aperture 116 are four spaced support rods 117, as illustrated in FIGURES 1, 15 and 17. Rigidly secured to a pair of the support rods 117 is a pair of vertically spaced clamps 118, 119 and each of which is provided with set screws 120 for adjusting the vertical position and the relative distance between the clamps 118, 119 on the support rods 117. Each of the clamps 118, 119 is centrally apertured for accommodating thermocouple wires which are retentively held in place by means of set screws 121. Rigidly secured to the opposite set of opposed support rods 117 are a pair of vertically spaced clamps 122, 122'. Each of the clamps 122, 122' is centrally apertured in order to accommodate a hollow conduit 124 and which is held in place by means of set screws 121 operatively mounted on each of the clamps 122, 122'. Fitted upon the upper end of the conduit 124 is a terminal head 125 preferably formed of Pyrex or other non-electrically conductive material. The head 125 is also hollow and provided with a pair of apertures 126 for accommodation of the electrical leads which pass through the conduit 124. In this connection, it should be noted that the electrical leads 127, which are connected to a temperature sensor 128 pass through the conduit 124 and through the aperture 112 and the duct 107 formed in the plate 102. In similar manner, the thermocopules also pass through one of the apertures 112 formed in the plate 108 and through the duct 107 formed in the plate 102. By further reference to FIGURE 16, it can be seen that the electrical leads 127 are actually connected to conductive terminal screws 129 and then to the temperature sensor 128. The temperature sensor 128 is conventional in its construction and is, therefore, not described in detail herein. A cluster of thermocopules for the hot junction of a thermocouple can also be used as the temperature sensor.

Shiftably disposed on the upper end of the connecting tube 70, which is also externally threaded, at its upper end is a retaining washer 130, which is of the type illustrated in FIGURES 14 and 18. The washer 130 is also provided with a pair of arcuate slots for accommodating the arcuate section of the connecting tube 70. As indicated previously, the connecting tube 70 is provided with a pair of opposed vertical slots near its upper end. Accordingly, it can be seen that the retaining washer 130 is vertically shiftable on the upper end of the connecting tube 70 but is not rotatable thereon. Disposed on opposite sides of the retaining washer 130 are a pair of nylon washers 131 and also disposed against each of the washers 131 and threaded to the upper end of the connecting tube 70 are a pair of locking nuts 132. Thus, it can be seen that as the locking nuts 132 are turned about the upper threaded section of the connecting tube 70, the retaining washer 130 is vertically shifted thereon. Furthermore, by tightening both of the locking nuts 132, it is possible to hold the retaining washer 131 in a rigid position. Also threadedly secured to the retaining washer 130 internally in the conecting tube 70 is a connecting rod 133. Secured to the upper end of the connecting rod 133 is a lower sample clamp 134 for removably clamping a test sample *t*. Secured to the upper end of each of the support rods 117 is a retaining plate 135, which is held thereon by means of bolts 136, which are threaded into internally threaded tapped ends on each of the support rods 117, in the manner as illustrated in FIGURE 15. Also secured to the retaining plate 135 is an upper sample clamp 137, which is more fully illustrated in FIGURES 1 and 15.

The clamps 134, 137 may be of any conventional type for releasably retaining samples of the type employed in the measurements of the present invention. However, the present invention is capable of performing measurement and analysis on samples which are as thin as .001" such as the thickness of paint films up to samples which may be as much as 1/16" thick. Furthermore, the present invention is designed to perform test analysis on samples which range from fairly rigid plastic samples with relatively small elongations to paint films or to rubber samples which can have considerable elongation. In the test analysis of the present invention it is important that the test samples *t* be rigidly held within the clamps 134, 137 since any slipping of the sample in the clamp or any unauthorized displacement would materially interfere with accurate measurements. It is, therefore, desirable to employ clamps of the type described in our copending application, Ser. No. 562,311, filed July 1, 1966. It is also preferred to employ the jig while securing the test samples to the clamps 134, 137, which is also described in said copending application.

The clamps described in said copending application generally comprise an outer housing having a pair of inclined front and rear walls, each of which are fluted on their external surfaces. The front and rear walls are connected by side walls forming an internal compartment in the housing. Shiftably disposed within the housing are a pair of spaced opposed wedges which move along the inclined walls and are, therefore, adapted to shift toward and away from each other. The wedges are spaced and are, therefore, adapted to accommodate a specimen or member to be clamped. A vertically shiftable bolt or shaft is operatively disposed within the housing and engages the lower end of the wedges and is shiftable therewith. The bolt is provided with an enlarged head and secured thereto is an enlarged plate which is spring biased so that the wedges are biased toward the closed position. A compression spring is interposed between a wall in the housing and the plate on the shiftable bolt in such manner that the wedges are forced against the inclined wall and toward a clamping position.

A knurled nut is disposed on an externally threaded portion of the shaft or bolt and is capable of being tightened against the housing in such manner that the bolt is urged in a direction outwardly of the housing. As this occurs, the head of the bolt and the plate secured thereto will be pulled to a position against the action of the spring so that the wedges are shifted out of clamping position or to the disengaged position.

Secured to the lower end of each of the end walls is a rectangularly shaped lower block which is internally bored to accommodate the lower end of the externally threaded bolt. The bolt or main shaft is also internally bored to accommodate a support shaft for securement to a testing device or similar instrument. The rectangular block is integrally provided with a downwardly extending circular nipple which is externally threaded and is diametrally slotted. The nipple is hollow and accommodates a retaining plug having a guide bar which extends through the slots in the nipple. The retaining plug is also centrally apertured to accommodate a stationary support rod and is provided with means for securing the rod to the plug. Finally, a knurled cap is disposed over the externally threaded nipple and holds the aforementioned elements securely in place.

By further reference to FIGURES 1 and 15, it can be seen that the upper end of the connecting rod 133 is inserted into the retaining plug on the lower end of the lower sample clamp 134 and is held in place by the knurled cap disposed over the retaining plug.

Disposed over the four support rods 117 and all of the structure supported thereon and being secured to the cover plate 114 is an outer sample housing 138, as illustrated in FIGURES 2, 19 and 20. The sample housing 138 comprises a base plate 139, which is centrally apertured to accommodate a hollow insulating plug 140, the latter having a circular depending projection 141, which extends through the aperture formed in the base plate 139 and into the aperture 116 formed in the cover plate 114, in the manner as illustrated in FIGURES 3 and 19. The base plate 139 is removably secured to the cover plate 114 by means of machine screws 142 having knurled heads 143 for easy removal thereof.

The insulating plug 140 is provided with a central bore 144, which communicates with the aperture 116 and is also provided with a diametrally enlarged recess 145 for accommodating the lower end of an open-ended sample tube 146. The tube 146 is circular in horizontal cross section and is provided with a fluid inlet aperture 147 at its upper end, reference being made to FIGURE 19. Concentrically disposed about the lower end of the sample tube 146 is a Teflon jacket 148, which is sealed at its lower end against the peripheral margin of the sample tube 146 by means of an annular fluid seal 149, which is preferably made of a neoprene rubber. The Teflon jacket 148 is spaced from the side wall of the sample tube 146 thereby forming an annular fluid chamber 150. The Teflon jacket 148 is also provided with a series of inwardly extending wall-engaging flutes 151, which are circumferentially formed on the interior surface thereof and which engage the exterior wall of the sample tube 146. Furthermore, the jacket 148 is integrally formed with an annular gas distributing chamber 152. A pipe fitting 153 is threaded in this chamber at one point on its circumference and is suitably connected to a source of an inert gas (not shown). For the purposes of the present invention, it has been found that nitrogen provides a gaseous media for introduction into a sample chamber 154, which is formed by the sample tube 146. The nitrogen enters at a temperature below the desired sample temperature and is brought up to that desired by addition of heat from a heating coil hereinafter described. A heating coil 155 is circumferentially disposed about the exterior surface of the sample tube 146 in the manner as illustrated in FIGURE 19. For operation below ambient room temperature the nitrogen is cooled by liquid nitrogen. Above this temperature the nitrogen is taken directly from cylinders and is not cooled.

Disposed about the sample tube 146 and being spaced therefrom to form a gas passageway 156, is a Dewar insulating outer envelope or jacket 157, which is double-walled, internally silvered and evacuated, as illustrated in FIGURE 19. The jacket 148 is integrally provided with an outwardly extending bead 158 for engaging the interior wall of the envelope 157 in the manner as illustrated in FIGURE 19. Furthermore, the jacket 148 is provided with a pair of outwardly extending jacket-engaging flanges 159 for engaging the lower end of the heat insulating outer envelope 157. An annular seal 160, preferably formed of a neoprene rubber is disposed between the pair of flanges 159 and also provides a gas seal between the envelope 157 and the jacket 148. By means of this construction, it can be seen that a gas admitted to the gas chamber 150 through the fitting 153 is conveyed upwardly through the chamber 150 and outwardly of the open upper end thereof. The gas is then admitted to the gas passageway 156 where it can be urged into the sample chamber 154 through the aperture 147. It is to be noted that the bead 158 in the annular seal 160 prevents any of the gas from escaping from the gas chamber 150 and gas passageway 156.

The insulating outer envelope 157 is retentively held in place by means of four upstanding support rods 161, which are secured to the plate 139 by means of bolts 162. At their upper ends, the support rods 161 are tapped and internally threaded to accommodate bolts 163 which, in turn, hold a retainer plate 164, the latter being disposed against the upper surface of the insulating outer envelope 157 in the manner as illustrated in FIGURES 2 and 19. By means of this construction, it is possible to remove screws 142 and hence remove the sample housing 138 as desired. The insulating outer envelope 157 is also provided with a pair of diametrally opposed clear windows 165 in the silvering for viewing the interior of the chamber 154.

OPERATION

Before the sample can be inserted into the unit and testing can be started, the guide wire 87 must be installed in the unit and adjustments made to center the wire 87 so as to guide the force coil 58 centrally in the air gap 40. Once these adjusctments are made and not disturbed, testing can be continued until it is necessary to realign the equipment.

After the guide wire 87 is in place, alignment is carried out, first, by centering the guide ring 11 through adjusting the set screws 14. Since the assembly consisting of the guide ring 11, plate 13, and the tube 15 and the linear voltage differential transformer assembly 18 are all precision machined and assembled concentrically, the central bore formed thereby will be aligned concentrically with the air gap 40 when the outer ends of the screws 14 are adjusted to equal penetration or projection from the walls 9 of the plate 7.

The screws 52 in the annular wall of the plate 50 are adjusted to shift the ring 48 so as to relax the brass strips 59 and remove any positioning influence on the force coil 58 in air gap 40. Juxtapositioning the coil 58 in the air gap 40 is accomplished by adjusting the screws 74' in the retainer plate 74 to shift the reference disc 73 until no interference is manually sensed between the coil 58 and walls of the air gap 40. The interference is checked throughout the limits of travel by manually lifting and lowering the tube 70. Any lack of concentricity of the wire 87 throughout its length with the air gap 40 will cause interference. This can be corrected by the proper combination of adjustments of set screws 14 in the walls 9 of the plate 7 which controls the lower end of the wire 87 and the set screws 74' in the retainer plate 74 which controls the upper end of the wire 87. When this alignment is completed the screws 52 in the annular wall of the plate 50 are adjusted to shift the ring 48 to remove slack in the brass strips 59 so that the coil 58 is restrained from rotating but is not impeded in vertical travel.

The upper clamp 137 is removed from the retaining plate 135 by means of removing the enlarged head forming part of the clamp which secures the clamp 137 to the plate 135. Thereafter, the lower clamp 134 is also removed from the connecting rod 133, also in the manner as previously described. The clamps 134, 137 are then secured to a jig or so-called fixture of the types described in our copending application, Ser. No. 562,311, filed July 1, 1966, for holding the clamps 134, 137 in proper alignment. It is important in connection with the present invention to provide proper alignment of each of the clamps so that the test sample *t* will be secured therebetween in true vertical alignment. If the test sample *t* happens to be skewed when secured to each of the clamps, this may cause undue strain on the lateral faces of the test sample *t* and these stresses would materially interfere with the true dynamic viscoelastic measurements. Furthermore, the jig described in said copending application also provides for proper spacing of the two clamps 134, 137 so that a preselected distance exists therebetween.

After the sample *t* has been secured to the clamps 134, 137, the upper clamp 137 is then secured to the retaining plate 135 in the manner as previously described. The lower clamp 134 is also secured to the connecting rod 133 in the manner as previously described. It should be noted that a first type of course adjustment of the position of the lower clamp 134 is attained when the connecting rod 133 is secured to the lower clamp 134. The nipple, which forms part of the retaining plug in the lower clamp is hollow and accommodates the connecting rod 133. If it is desired to lower the lower clamp 134, the lowermost of the locking nuts 132 is threaded downwardly on the externally threaded section of the connecting tube 70. Thereafter, the locking nut 132 is turned to force the retaining washer 131 downwardly and this will, in turn, carry therewith the connecting rod 133. In similar manner, if it is desired to shift the lower clamp 134 upwardly, the locking nut 132 is first released, permitting the lower locking nut 132 to shift the retaining washer 131 upwardly. After the clamps 134, 137 have been securely connected to the viscoelastometer A, the sample housing 138 is then disposed over the support rods 117 so that the support rods 117 extend upwardly into the sample chamber 154. The sample housing assembly 138 is lowered so that the flange 141 of the insulating plug 140 extends into the aperture 116, and a plate 139 is facewise disposed upon the upper surface of the plate 114. The knurled heads 143 are then turned so that the machine screws 142 rigidly affix the outer sample housing 138 to the cover plate 114. The pipe fitting 153 is next connected to a suitable source of nitrogen (not shown). The gas conduit 105 may also be suitably connected to a gas discharge, if desired.

After the sample *t* has been securely positioned in the clamps 134, 137 and the outer housing assembly 138 has been affixed to the plate 114, the LVDT assembly 18 can be shifted along the externally threaded surface of the mounting tube 15 and with respect to the core 95 so that a null reading is attained before any measurements are undertaken. This is possible by merely turning the outer knurled housing 19 so that the entire LVTD assembly 18 is shifted vertically on the mounting tube 15 in the manner as previously described. The device for indicating the null signal when the outer knurled housing 19 is at the proper setting is conventional in its construction and is, therefore, neither illustrated nor described in detail herein.

After proper adjustments have been made, it is possible to determine whether the guide wire 87 contacts any portion of the housing such as the guide tube 91 by determining if the guide wire is electrically grounded to the rest of the housing. The guide wire is insulated for its supports and housing by the insulating bushing 79 and washer 84 at the top and by the bushing 17 and washer 17' at the bottom. It should be understood that once the guide wire 87 is properly positioned with respect to the remainder of the housing, no further positioning is really necessary except when a major overhaul of the apparatus A is undertaken.

The electromagnetic coil 36 is connected to a constant current D.C. source in order to provide a magnetic field for the force coil 58. The connector plates 55 are, in turn, connected to an electrical signal which will cause the force coil 58 to produce the desired stress on the sample. This signal will consist of a sinusoidal component plus a direct current which will bias the sinusoidal stress so that sample will always be in tension and never tend to be compressed. Also, constant direct current of opposite polarity will be introduced to produce a force to counterbalance the weight of the moving parts. In addition, another sinusoidal signal of a frequency much higher than coil 58 is capable of following is introduced. This will cause the coil to vibrate and overcome any friction between the guide wire 87 and the jewel-bearings 92 and 101. The method for generating these signals is not described herein, since it is conventional. The electromechanical system described herein is designed so that the force is linear with current which has been found to be necessary in establishing the nature of the force in this system. Furthermore, the unit can be used as a transducer to measure the force by measuring current. This eliminates the need of a separate force measuring unit and the necessity for correcting the elongation that any such unit would produce.

The fitting 45 is connected to a source of a suitable coolant such as a nitrogen gas or air for cooling of the coil 58. The coolant gas which is admitted through the fitting 45 passes through the duct 44 and through the annular groove 43 and through the vertical gas ducts 42 into the air gap 40. The portion of the gas which passes along the inside of the coil 58 will be forced downwardly through the area existing between the guide sleeve 66 and the interior wall of the bore of the magnetic core 39. This gas will then pass into the area interior of the support ring 11 and outwardly through the exhaust apertures 9'. On the other hand, the portion of the coolant which is admitted through the fitting 45 and which passes along the exterior of the forcing coil 58 will pass upwardly beyond the support plate 57 into the interior of the guide ring 48 and outwardly through the exhaust apertures 50'. In this manner, it is possible to provide the necessary amount of cooling for the forcing coil 58. This cooling is required when the force coil 58 is required to exert heavy forces and generally is not required for testing light samples.

Gaseous nitrogen is next admitted into the sample chamber 154 through the fitting 153 and in the manner as previously described. The gas will flow through the gas passageway 156, through the aperture 147 and into the sample chamber 154. The gas which is admitted to the chamber 154 will be forced downwardly therethrough and through the aperture 116 and the bore 144 formed in the insulating plug 140. This gas is then passed through the aperture 111 formed in the mounting plate 108 and outwardly through the gas duct 106, the gas housing 104 and the gas conduit 105. Again, the conduit 105 may be connected to a suitable compartment for receiving the discharge gas, if desired. The nitrogen gas, which is admitted to the housing of the sample chamber 154 is precooled to a temperature of approximately 20° C. lower than the desired sample temperature. The nitrogen is cooled by bubbling a portion of it through liquid nitrogen to cool it to below —190° C. and this is mixed with ambient temperature nitrogen from a supply cylinder to bring the mixture up to 20° C. below the sample temperature. The nitrogen then is brought up to the desired sample temperature by the heating coil 155. When the sample temperature is 20° C. higher than ambient temperature the liquid nitrogen cooling is not used and only ambient temperature nitrogen is used.

After the sample has been mounted in the testing clamps 134, 137, the force coil 58 is energized with currents having the components previously described to cause a sinusoidal force to be impressed on the test sample *t*. Basically, the viscoelastometer stretches a sample with a measured sine wave of force and the resulting sine wave of elongation produced in the sample can be measured by apparatus neither disclosed nor described herein. The elastic modulus is computed by any conventional computer device from the peak value of the sine wave of force divided by the peak value of the sine wave of elongation, multiplied by the length of the sample and divided by its area. The loss factor is equal to the tangent of the phase angle between the sine wave of the force and the sine wave of the elongation.

The LVDT assembly 18 may be connected to a computerized apparatus for calculating the dynamic viscoelastic properties. This computerized apparatus is not the subject matter of the present invention and is, therefore, neither illustrated nor described herein. However, the output of the apparatus A, which is in the form of a sinusoidal wave together with a biasing current is transmitted to the computerized apparatus. The peak values of the sine waves are then measured and stored. The current, which is admitted to the force coil 58 is the measurement of force. However, due to the viscous nature of the test sample *t*, the sample cannot exactly follow the sinusoidal force.

The LVDT will, in turn, provide a sinusoidal wave, which reflects the effects of the viscous nature of the test sample in response to the input current to the force coil 58. The angle between the two sine waves is next measured. The tangent of the angle is directly proportional to the loss modulus. The elastic modulus is proportional to the force divided by the elongation, which is measured by the LVDT and the sample dimensions.

The temperature of the sample is raised during the testing from the lowest point by increasing the temperature of the nitrogen introduced into the sample chamber 154 through fitting 153 and by raising the set point of the temperature controller (not shown) which regulates the current flow to the heating coil 155. The apparatus A may employ either the sensor 128 or a number of thermocouples terminated in sample chamber 154 which are hot junctions of a thermopile system for actuating the temperature controller. The cold junctions of the thermocouples are terminated in a conventional cold junction compensator (also not shown). A more conventional single thermocouple system could be used herein if the resulting degree of temperature control is satisfactory. An independent temperature monitoring thermocouple in the sample chamber 154 is disposed between the two support rods 117 shown in FIGURE 1.

Within the elastic limit, the elongation of the sample will be proportional to the force applied by the force coil and inversely proportional to the elastic modulus of the sample. As was previously stated, the force exerted by the force coil is linear with the current, and therefore, the elongation of the sample will be proportional to coil current.

The elongation of the sample will cause the core 95 of the linear voltage differential transformer assembly 18 to move with respect to its coils 26. An alternating current carrier voltage having a frequency of several kilocycles per second is impressed on the central primary coil of the three coils 26, and this will induce equal and opposite voltages in the secondary coils on each side of center if the core 95 is exactly in the center. The net output of the secondary will then be zero. When the core is moved up to its maximum position, the voltage induced in the coil above center will rise to a maximum, the opposing voltage induced in the lower coil will decrease to a minimum, and the net voltage from the secondary will be a maximum. The same occurs when the core moves to the maximum in the lower direction except that its polarity or phase is reversed. Actually, the output from the secondary consists of a carrier signal which has its amplitude modulated or made proportional to the position of the core 95 with respect to the center of the coils 26. The output of the secondary is fed to a conventional phase sensitive demodulator (not shown) which removes the carrier frequency and produces a direct current signal which is a direct measure of the elongation of the sample. When the core moves from a maximum upward position down to a maximum lower position, the direct current signal will go from a maximum positive value to zero and then to a maximum negative value.

The testing of a sample can be made at a constant frequency of forcing and at a variable increasing temperature or at a constant temperature and a variable frequency. For most samples the test of most interest will be that at constant frequency and at increasing temperature. Under these conditions, the elastic modulus will decrease and the loss factor will increase with increasing temperature. These variables will change at least 1000 to 1 in magnitude from the lowest to the highest temperature of interest. If sufficient force is applied to the sample to obtain enough elongation for an accurate measurement when the temperature is lowest and the elastic modulus is highest, and if the force is held constant, the elongation will tend to be so great that the sample may tear apart before the highest desired temperature is reached. To prevent this, the force must be decreased as the temperature is raised. If the testing is to be controlled automatically it is desirable to keep the force constant until the elongation is about 30 (approximately $\sqrt{1000}$) times the minimum value, and then decreased at a rate to keep the elongation constant. This method of operation simplifies the controls for automatic operation, and also, restricts the measurement of force and elongation to ratios of a little over 30 to 1 for a change in magnitude of 1000 to 1 in the elastic modulus.

EXAMPLE

The invention is further illustrated by, but not limited to, the following example.

A dynamic viscoelastometer of the type described herein was constructed and certain modifications were made thereto for testing purposes. In this dynamic viscoelastometer the driving unit which consists of the forcing coil and its magnetic field was found to serve an integral role in the operation of the viscoelastometer. It was determined that this unit must function as an electric current to force transducer, and as such the magnetic field in which the coil moved was required to be uniform so that the force produced by the coil was always proportional to the current. This eliminated a force measuring device and the need of correcting for the elongation appearing across this device and not appearing across the sample. The heating chamber was made of glass open on one end and contained in a Dewar type jacket. The glass construction reduced the mass to be heated, and this construction in addition to the insulating qualities of the jacket, improved the response to temperature control.

The first driving unit tried was a modification of a voice coil and a permanent magnetic field removed from a high fidelity 15" diameter low frequency loud speaker rated at 60 watts. This unit was selected because the permanent magnet field had a high total flux which was expected to be iniform over the poles because of the Hi Fi rating, and as a result, should make a linear drive.

Attempts were made to support the force coil in the air gap of the magnet with sets of springs above the coil and below the magnet, but every spring system which was tried was stiff enough to center the coil without touching the poles of the magnet, but produced too much restraint on the coil. Finally, a guide system using fine link jewelry chain instead of the springs was tried, and it appeared to have no force restraining the coil when the weight of the coil was floated magnetically.

The drive unit was calibrated for force versus current in the coil by balancing the coil on the end of a beam of a sensitive scale. The fact that the scale would not balance for forces over 150 grams lead to the suspicion that the magnetic flux was not uniform over the poles. This was confirmed when a Hall effect probe indicated that the flux linking the coil increased as the coil moved down in the air gap of the magnet. This factor also explained why increasing force made the scale behave like its fulcrum was below the center of gravity of the beam system.

An electromagnet field was designed having a pole system 1½" with a 1" wide center band in the air gap where the flux density was uniform to at least one part in a thousand. This field provided a flux linkage with the ¾" wide force coil which was constant to 0.1% in its ±0.100" travel. The calibration of force versus coil current was repeated using this field and no unstability of the scale was found. However, it was found that the chain guiding system had too much friction for the accuracy desired.

The coil support using two watch jewels riding on a tightly stretched fine piano wire was then developed. It was found that the last trace of force restraint could be eliminated by gently vibrating the force coil assembly with a small 60 cycle current introduced into the force coil with the regular force current. The frequency range was arbitrarily set at 1000 to 1 or 30 to .03 cycles per second making the mean about one cycle per second which is approximately the average frequency of testing done in the past. When this was done, a 10 mg. weight placed on the coil while it was balanced by the scale caused a slight deflection of several micro inches which was measured by the LVDT. Upon removal of the weight, the LVDT indicated a return to exact center indicating that the suspension was sensitive to a force of something less than 10 mg. A calibration of the coil indicated that force was linear with current. Linear forces up to about 10 kg. can be developed if air cooling of the coil is used.

Having thus described our invention what we desire to claim and secure by Letters Patent is:

1. A viscoelastometer for measuring the physical characteristics of specimens when a stress is imposed thereon, said viscoelastometer comprising:

(a) base means, (b) a specimen chamber operatively mounted on said base means, (c) clamping means disposed within said chamber for holding said specimen, (d) a housing operatively mounted on said base means and having an aperture therein, (e) magnetic field producing means operatively disposed in said housing, (f) a force coil movable in said magnetic field producing means responsive to an external signal, (g) first connecting means operatively connecting said force coil and said clamping means so that said force coil is movable with said clamping means, (h) electromagnetic sensing means creating a signal proportional to the deformation in said sample, (i) and second connecting means operatively connecting said force coil and said sensing means to energize said sensing means in response to movement of said force coil.

2. The viscoelastometer of claim 1 wherein the specimen chamber is provided with a gas inlet and gas outlet for circulating a temperature regulating fluid.

3. The viscoelastometer of claim 1 wherein a heating element is disposed around said specimen chamber for regulating the temperature therein and a temperature sensor is disposed within said chamber.

4. The viscoelastometer of claim 1 wherein the electromagnetic sensing means is a linear variable differential transformer.

5. The viscoelastometer of claim 1 wherein the electromagnetic sensing means comprises a coil capable of producing an electrical pulse, and exciter means operatively connected to said clamping means and being movable in and capable of producing an electrical pulse in said coil upon movement of said exciter means in said coil.

6. A viscoelastometer for measuring the physical characteristics of specimens when a stress is imposed thereon, said viscoelastometer comprising:

(a) base means, (b) a specimen chamber operatively mounted on said base means, (c) clamping means disposed within said chamber for holding said specimen,
(d) a housing operatively mounted on said base means and having an aperture therein,
(e) magnetic field producing means operatively disposed in said housing,
(f) a force coil movable in said magnetic field producing means responsive to an external signal,
(g) a plate secured to said force coil,
(h) connecting means operatively connecting said plate and said clamping means so that said force coil is movable with said clamping means,
(i) a first tube secured to said force coil and being movable therewith,
(j) a second tube secured to said first tube and being movable therewith,
(k) a first jewel type bearing operatively attached to said first tube,
(l) a second jewel type bearing operatively attached to said second tube,
(m) disc means operatively mounted on said base means and being being independent of the movement of said plate and force coil,
(n) electromagnetic sensing means operatively connected to said connecting means and creating a measured signal proportional to the deformation in said sample,
(o) and a guide wire secured to said disc and being disposed in said first and second tubes and said first and second bearing means so that said first and second tubes are movable with respect to said guide wire.

7. The viscoelastometer of claim 6 further characterized in that said electromagnetic sensing means comprises a coil operatively mounted on said base means, and a core operatively mounted on said second tube and being movable therewith in said coil.

8. The method of performing dynamic viscoelastic measurements on test specimens, said method comprising:
(a) securing one end of said specimen,
(b) securing the other end of said specimen to a movable member,
(c) securing the movable member to a force coil movable in a magnetic field,
(d) introducing a first electrical signal in said coil to cause a dithering action thereon,
(e) introducing a second electrical signal in said coil to create a magnetic suspension thereof,
(f) introducing a third electrical signal in said coil and causing a tensional effect on said specimen,
(g) introducing a fourth electrical signal in said coil to cause a vibratory movement thereof, and thereby cause a vibratory movement of said specimen, and
(h) producing an electrical output in response to the amount of vibratory movement of said specimen.

9. The method of claim 8, further characterized in that said first electrical current is an alternating current, said second electrical current is a direct current, said third electrical current is a direct current and said fourth electrical current is an alternating current.

10. The method of claim 9 further characterized in that said third electrical current is opposite in direction to said second electrical current.

11. The method of claim 9 further characterized in that the fourth electrical current is in the form of an alternating current sinusoid and that the output electrical current is in the form of an alternating current sinusoid.

12. The method of claim 8 further characterized in that a series of said operations are performed and that the temperature of the sample is changed during said measurements.

13. The method of claim 12 further characterized in that the temperature of the sample is initially held at −150° C. and is increased to a temperature of +250° C.

14. A viscoelastomer for measuring the physical characteristics of specimens when a stress is impressed thereon, said viscoelastometer comprising:
(a) a base plate,
(b) a first plate operatively mounted on said base plate and having an upstanding wall,
(c) a first guide ring operatively disposed in the wall of said plate and being radially shiftable therein,
(d) said first plate having an aperture,
(e) a mounted tube rigidly secured to said guide ring and extending through the aperture in said first plate,
(f) a first ring member operatively mounted on and externally of said mounting tube and being vertically shiftable therein,
(g) a liner variable differential transformer coil operatively secured to said ring and being movable therewith,
(h) a second plate operatively mounted on the vertical wall of said first plate,
(i) an outer housing secured to and extending upwardly from said second plate,
(j) a top wall secured to said housing,
(k) an annular flange formed with said top wall and extending downwardly into said housing,
(l) said top wall having an aperture surrounded by said flange,
(m) an electromagnetic coil disposed within said housing and being engageable by said second plate, said top wall and said flange,
(n) said electromagnetic coil having a central bore,
(o) a magnetic core operatively mounted on said second plate and extending upwardly through the aperture formed by said flange,
(p) said magnetic core being spaced from said flange and said electromagnetic coil, thereby forming an annular groove,
(q) a third plate operatively mounted on said top wall,
(r) a fourth plate operatively mounted on said third plate, said fourth plate having an internal chamber,
(s) a second guide ring operatively disposed within the internal chamber of said fourth plate and being radially shiftable therein,
(t) a reference disc operatively mounted on said fourth plate,
(u) a fifth plate operatively mounted on said fourth plate and holding said reference disc in facewise engagement with the upper surface of said fourth plate,
(v) a sixth plate operatively mounted on said fifth plate,
(w) a seventh plate operatively disposed within said second guide ring,
(x) a forcing coil secured to said second plate and extending downwardly therefrom into said annular groove,
(y) a first tube secured to said seventh plate and extending downwardly therefrom,
(z) a second tube concentrically disposed within said first tube and extending downwardly and outwardly therefrom, said second tube also extending into said linear variable differential transformer coil,
(a′) a magnetic core operatively mounted on said second tube and being shiftable in said linear variable differential transformer coil,
(b′) a first jewel-like bearing operatively mounted in said first tube in proximate alignment with the upper end of said second tube,
(c′) a second jewel-like bearing operatively mounted on the lower end of said second tube,
(d′) a third tube operatively mounted on said reference disc and extending downwardly therefrom,
(e′) a guide wire secured to said third tube and extending downwardly and outwardly therefrom, said guide wire extending through said first and second jewel-like bearings, said first and second tubes being sufficiently straight so that said guide wire does not contact any portion of said first or second tubes, (f') a plug operatively mounted on the lower end of said mounted tube, (g') means in said plug for securing said guide wire at its lower end in said plug, (h') an eighth plate removably secured to said second plate, said eighth plate having an aperture, (i') an insulating plug disposed on said eighth plate and having a portion thereof which extends through the aperture in said eighth plate, (j') a sample housing operatively disposed on said plug and extending upwardly therefrom, (k') a first jacket surrounding said housing and providing heat insulation therefor, (l') said jacket being spaced from said housing forming an annular fluid passageway, (m') a sleeve surrounding said sample housing near the lower end thereof, (n') said sleeve being spaced from said housing forming a fluid chamber, (o') means providing interconnection between said fluid chamber and said passageway, (p' means connected to said sleeve for admitting fluid to said fluid chamber, (q') means forming an aperture in said sample housing so that fluid in said fluid chamber may pass through said fluid passageway and into said housing, (r') means for withdrawing the fluid admitted to said sample housing, (s') means for admitting a cooling fluid to said electromagnetic coil and said force coil, (t') means for withdrawing said last-named cooling fluid, (u') a plurality of support rods secured to said eighth plate and extending upwardly in said sample housing, (v') a ninth plate secured to the upper end of said rods, (w') a first clamp removably secured to said ninth plate, (x') a plurality of posts secured to said seventh plate and extending upwardly through apertures formed in said reference disc, (y') a connecting member secured to the upper ends of said posts and extending upwardly into said sample housing, (z') a connecting cord operatively connected to said connecting member, (a") means for adjusting the relative position of said connecting cord with respect to said connecting member, (b") a lower clamp secured to the upper end of said connecting member and being spaced downwardly from said upper clamp for engaging a test specimen therebetween, (c") temperature sensing means operatively mounted in said sample housing, (d") and a heating coil operatively surrounding said sample housing for regulating the temperature in the interior thereof.

15. A viscoelastometer for measuring the physical characteristics of specimens when a stress is imposed thereon, said viscoelastometer comprising:

(a) base means, (b) a specimen chamber operatively mounted on said base means, (c) clamping means disposed within said chamber for holding said specimen, (d) a housing operatively mounted on said base means and having an aperture therein, (e) magnetic field producing means operatively disposed in said housing, (f) a force coil movable in said magnetic field producing means responsive to an external signal, (g) first connecting means operatively connecting said force coil and said clamping means so that said force coil is movable with said clamping means, (h) electromagnetic sensing means creating a signal proportional to the deformation in said sample, (i) second connecting means operatively connecting said force coil and said sensing means to energize said sensing means in response to movement of said force coil, and (j) thin wire guide means disposed in said aperture for maintaining said second connecting means in friction-free position out of contact with the walls of said aperture.

16. The viscoelastometer of claim 15 wherein a frame-like member having a plurality of jewel type bearings is disposed in said aperture for retaining said thin wire guide means and maintaining said second connecting means in friction-free position out of contact with the walls of said aperture.

17. The method of performing dynamic viscoelastic measurements on a test specimen, said method comprising:

(a) securing one end of said specimen, (b) securing the other end of said specimen to a movable member, (c) securing the movable member to a force coil movable in a magnetic field, (d) introducing a first electrical signal in said coil to create a magnetic suspension thereof, (e) introducing a second electrical signal in said coil and causing a tensional effect on said specimen, (f) introducing a third electrical signal in said coil to cause a vibratory movement thereof, and thereby cause a vibratory movement of said specimen, and (g) producing an electrical output in response to the amount of vibratory movement of said specimen.

References Cited

UNITED STATES PATENTS

| | | | |
|---|---|---|---|
| 2,300,926 | 11/1942 | Hutcheson | 73—67.4 |
| 2,660,881 | 12/1953 | Van Degrift | 73—15.6 |
| 2,685,195 | 8/1954 | Streblow | 73—15.6 |
| 3,028,754 | 4/1962 | Huyser | 73—88.5 |
| 3,135,106 | 6/1964 | Lazan | 73—15.6 |
| 3,212,320 | 10/1965 | McClintock | 73—15.6 |
| 3,228,238 | 1/1966 | Jentet | 73—67.3 |

CHARLES A. RUEHL, Primary Examiner

U.S. Cl. X.R.

73—67.4